US008140698B2

(12) United States Patent
Codella et al.

(10) Patent No.: US 8,140,698 B2
(45) Date of Patent: Mar. 20, 2012

(54) METHOD AND SYSTEM FOR EFFICIENT DATA TRANSMISSION IN INTERACTIVE NETWORKED ENVIRONMENTS

(75) Inventors: Christopher Frank Codella, LaGrangeville, NY (US); Zhen Liu, Tarrytown, NY (US); George Viorel Popescu, Union, NJ (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 10/426,341

(22) Filed: Apr. 30, 2003

(65) Prior Publication Data

US 2004/0221053 A1    Nov. 4, 2004

(51) Int. Cl.
*G06F 15/16* (2006.01)
*G06F 3/00* (2006.01)

(52) U.S. Cl. .................. 709/231; 709/240; 715/757

(58) Field of Classification Search .................. 709/231; 715/757
See application file for complete search history.

(56) References Cited

U.S. PATENT DOCUMENTS

| 5,675,721 | A | * | 10/1997 | Freedman et al. | 345/502 |
| 5,956,039 | A | * | 9/1999 | Woods et al. | 345/419 |
| 6,012,092 | A | * | 1/2000 | Cuomo et al. | 709/223 |
| 6,169,545 | B1 | | 1/2001 | Gallery et al. | |
| 6,381,613 | B1 | | 4/2002 | Gallery et al. | |
| 6,476,802 | B1 | | 11/2002 | Rose et al. | |
| 6,684,255 | B1 | * | 1/2004 | Martin | 709/231 |
| 7,143,358 | B1 | * | 11/2006 | Yuen | 715/757 |
| 2003/0051136 | A1 | * | 3/2003 | Curtis et al. | 713/163 |

FOREIGN PATENT DOCUMENTS

EP    0899924 A2    3/1999

OTHER PUBLICATIONS

Abrams, et al, "Three-Tiered Interest Management for Large-Scale Virtual Environments", VRST 1998, pp. 125-130.*
Han, et al, "Scalable Interest Management Using Interest Group Based Filtering for Large Networked Virtual Environments", VRST 2000, pp. 103-108.*
Lee, et al, "ATLAS—A Scalable Network Framework for Distributed Virtual Environments", CVE 2002, pp. 47-54.*
Greenhalgh, Chris, "Spatial Scope and Multicast in Large Virtual Environments", 1996, The University of Nottingham.*
Popescu, et al. "On Scheduling 3D Model Transmission in Network Virtual Environments", 2002, Proceedings of the 6th IEEE Int'l Workshop on Distributed Simulation and Real-Time Applications.*
Chim et al. "On Caching and Prefetching of Virtual Objects in Distributed Virtual Environments." Proceedings of ACM Multimedia 1998. ACM Press, pp. 171-180. 1998.

* cited by examiner

*Primary Examiner* — Patrice Winder
*Assistant Examiner* — Julian Chang
(74) *Attorney, Agent, or Firm* — F. Chau & Associates, LLC; Preston J. Young, Esq.

(57) ABSTRACT

Various methods to prioritize the transmission of interactive digital content to multiple users to achieve efficient usage of available bandwidth are disclosed. The present invention covers prioritization of transmission of digital content based on information transmitted from the receiver. In addition, prioritization of multicast transmission of digital content to multiple clients accessing a shared interactive environment can be realized.

18 Claims, 3 Drawing Sheets

METHOD AND SYSTEM FOR EFFICIENT DATA TRANSMISSION IN INTERACTIVE NETWORKED ENVIRONMENTS

BACKGROUND OF THE INVENTION

1. Field of the Invention

The present invention relates generally to management of network resources, and more particularly, to techniques for providing resource-efficient data transmission in interactive networked environments.

2. Background of the Invention

Transmission of large graphics environments over the Internet has motivated considerable research. Much of this research has involved techniques for 3D-geometry compression. Various compressed geometry formats have been developed that allow 3D geometry to be represented in an order of magnitude less space than most traditional 3D representations, with very little loss in object quality.

Additionally, various techniques for managing 3D objects have been proposed. For example, U.S. Pat. Nos. 6,169,545 and 6,381,613 to Gallery et al. describe data management for a virtual environment browser. On the client side, the system maintains a master list of the client's environment, searches the list and places requests to the server when objects are missing from the inventory.

Other techniques emphasize caching and prefetching of objects. Chim et al., "On Caching and Prefetching of Virtual Objects in Distributed Virtual Environments," *Proceedings of ACM Multimedia '98*, ACM Press, pp. 171-180, 1998, disclose a scheme to cache object models. They also discuss prefetching object models by predicting those which are likely to be used in the near future and downloading them in advance.

Various other schemes make use of streaming technology. For example, European Patent EP0899924A2 discloses streaming technology for remote animation of an avatar. U.S. Pat. No. 6,476,802 to Rose et al. describes a system and method for streaming 3D objects which are visible in a static 3D scene.

SUMMARY OF THE INVENTION

The present invention comprises various techniques for prioritizing transmission of interactive digital content to multiple users to achieve efficient usage of available bandwidth.

According to an aspect of the invention, there is provided a method for efficient transmission of digital content to clients via a computer network, the digital content associated with a virtual environment. The method includes determining portions of the digital content to be transmitted to the clients. The portions of the digital content are scheduled for transmission so that the portions of the digital content are sent in a priority manner. The portions of the digital content are transmitted to the clients in accordance with the schedule to enable scenes from the virtual environment to be rendered.

According to another aspect of the invention, the scheduling step includes prioritizing the transmission of the portions of the digital content based on client-defined interest stored at the sender.

According to another aspect of the invention, the scheduling step includes prioritizing the transmission of the portions of the digital content using a parametric model based on client viewpoint position, position of objects in a scene, and visual attributes.

According to another aspect of the invention, the scheduling step includes prioritizing the transmission of the portions of the digital content based on predicted client navigation in the virtual environment.

According to another aspect of the invention, the scheduling step includes prioritizing the transmission of the portions of the digital content based on a correspondence of client interests.

According to another aspect of the invention, the scheduling step includes prioritizing the transmission of the portions of the digital content based on proximity of clients in a virtual space.

According to another aspect of the invention, the scheduling step includes prioritizing the transmission of the portions of the digital content based on aggregation of client interest and multicast transmission of the digital content to predefined interest groups.

According to another aspect of the invention, the scheduling step includes prioritizing the transmission of the portions of the digital content based on client-specified priorities determined according to service provider policies.

These and other aspects, features and advantages of the present invention will become apparent from the following detailed description of preferred embodiments, which is to be read in connection with the accompanying drawings.

DESCRIPTION OF PREFERRED EMBODIMENTS

Figure 1:
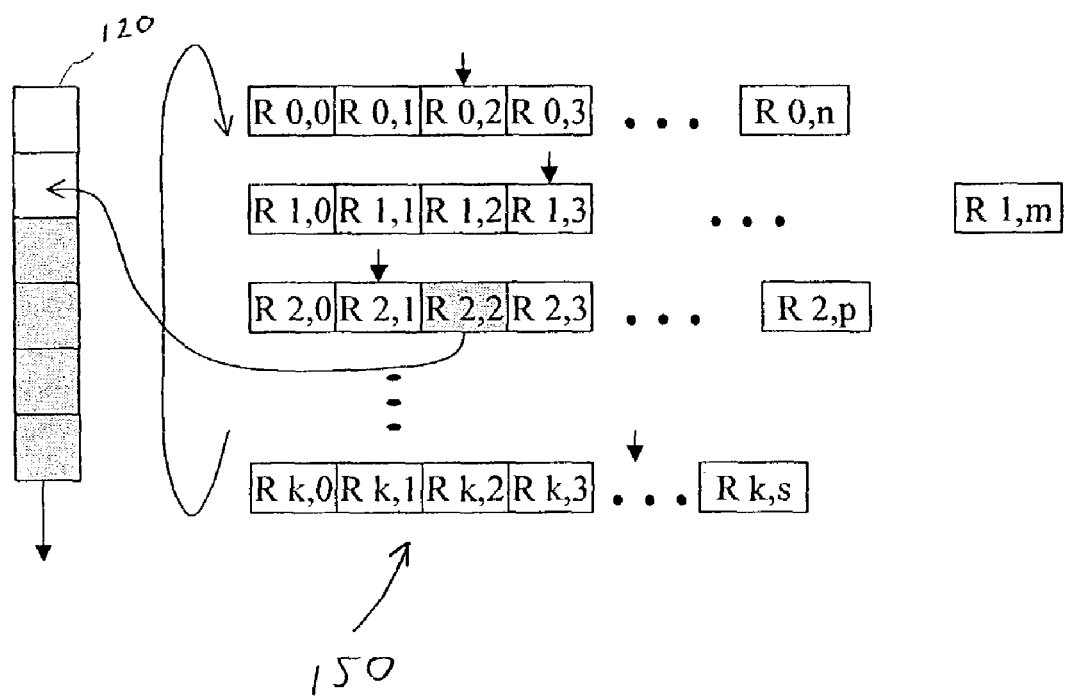
FIG. 1 illustrates an exemplary greedy scheduling approach for prioritization of data transmission in an interactive networked environment.

The present invention describes various techniques for prioritizing transmission of digital content between a sender and a plurality of receivers accessing a shared environment with multiple objects in order to make optimal use of available bandwidth. Transmission scheduling methods described herein allow efficient use of available bandwidth between the sender and the receivers in order to obtain the best quality of interactive environment rendered at the receivers.

Techniques described herein generally assume a database of objects contained in the environment is accessible at a server. Clients require partial replication of the contents of the database at run-time. The sender computes the receiver's interest in a subset of objects from the database and schedules transmission of these objects according to their priority.

When bandwidth is larger than that required by the transmission of the subset of objects of interest the receiver receives the objects just in time for being rendered. When bandwidth limitations do not allow transmission in time, the sender prioritize the transmission of geometry blocks (parts of multiresolution description of the geometry objects) such that the most important part of the environment is received at the client.

According to one exemplary embodiment of the present invention, a method for prioritizing data transmission uses a greedy scheduling approach. According to this embodiment, a server stores a virtual environment in a shared database containing multiple objects. Each object is described using a multiresolution model. The multiresolution representation of the objects can be progressive (reconstruction need all levels up to the current one) or composed of multiple objects of different resolutions. The virtual environment is composed of any combination of media objects. Here objects can be: 3D geometries; texture objects; audio objects; video objects, text objects. The server maintain a scene graph, or another indexing of the objects in the virtual environment, describing the location of the media objects and their properties. In addition to prioritization of transmission of blocks of the same type, blocks can be prioritized based on their media type. The prioritization is dynamic, favoring some types of media over other depending on application characteristics. For example in a static environment objects describing visual details can be given a higher priority than audio details while in a dynamic scene (such as a VE walkthrough) audio object can have higher priority. An environment description is used by the server to compute the list of objects that need to be entered in a scheduling queue. Selection of the objects is based either on their object identifier, on their media type, or other properties such as their position in the environment.

Under this approach, the server can access individually each block of data describing a multiresolution object and assign a priority based on the importance of the multiresolution block for the object and a set of priority parameters transmitted from the client. The server maintains a list of objects required to be transmitted to the each client. The set of objects required for transmission is computed based on client transmitted parameters (such as position in a map describing the shared environment).

As illustrated in FIG. 1, a plurality of a object queues 150 are maintained. The priority of each block in the object queues 150 is computed. A scheduler traverses the object queues 150 in a round-robin mode, selecting for transmission the block from the object queue 150 with the highest priority and places it in a FIFO transmission queue 120. The transmission of blocks is performed in the order they are entered in each object queue. As depicted in FIG. 1, a block for "block 2, object 2" (shaded) is selected and placed into the tail end of the FIFO transmission queue 120. The arrows point to the last block transmitted from each object queue.

The scheduler can use priority scores computed for each block in the object queue 150. The priority scores can be computed by composing an object importance function and a block importance function, for example. The priority scores can be updated each time new priority parameters are received from the client. A simple choice for object importance in a virtual environment is a function that varies linearly with distance from the viewpoint. Block importance can use nonlinear functions based on measurement of improvement of rendered quality with increase in object resolution. It is assumed that the blocks from each object can have unequal size and each object contains a variable number of blocks, pre-stored in an environment database.

Another factor affecting the efficiency of bandwidth usage is the cost of block transmission. Each block can be assigned a cost proportional to the size of the stored block in the database. Optimal scheduling of block transmission is an NP-complete problem in the general case of unequal blocks and variable block importance (which depends on client transmitted parameters). However in many cases the size of successive block does not vary considerably. Therefore a sub-optimal greedy approach can achieve a very good performance in the utilization of the available bandwidth. The greedy scheduling method can compute block transmission priority by dividing the importance of the data block with its cost.

Under this scheme, the scheduler analyzes the successor blocks of the last transmitted blocks from each object. The scheduler computes at each iteration only the priority of the successor of the last transmitted block. The maximum block is selected for transmission and placed in the FIFO transmission queue 120. In case a priority parameter is received from the client, all scores currently being analyzed need to be recomputed. The method is very efficient as it require little computing effort at the sender.

The efficiency of the scheduling method depends at least in part on the granularity of the object description. The computational effort increases linearly with the number of blocks in the scheduling queue. At the same time, the efficiency of the bandwidth usage decreases with the size of the blocks: transmission of a large block from a single object is less optimal than transmission of several smaller blocks from different objects whose aggregate size equals the size of the large block. There are two cases for the selection of object block size: a) size of the blocks is fixed; b) size of the blocks is variable. In the first case the blocks are equal with the data blocks describing the level of details of objects stored in the environment database. In the second case the transmission blocks are composed of multiple multiresolution blocks. The size of the blocks can be computed at the sender based on the impact of block granularity on the efficiency of data transmission. The size of the blocks can be adapted based on network and sender status parameters; e.g. reduce the size of the blocks in case of sender CPU overload.

Figure 2:
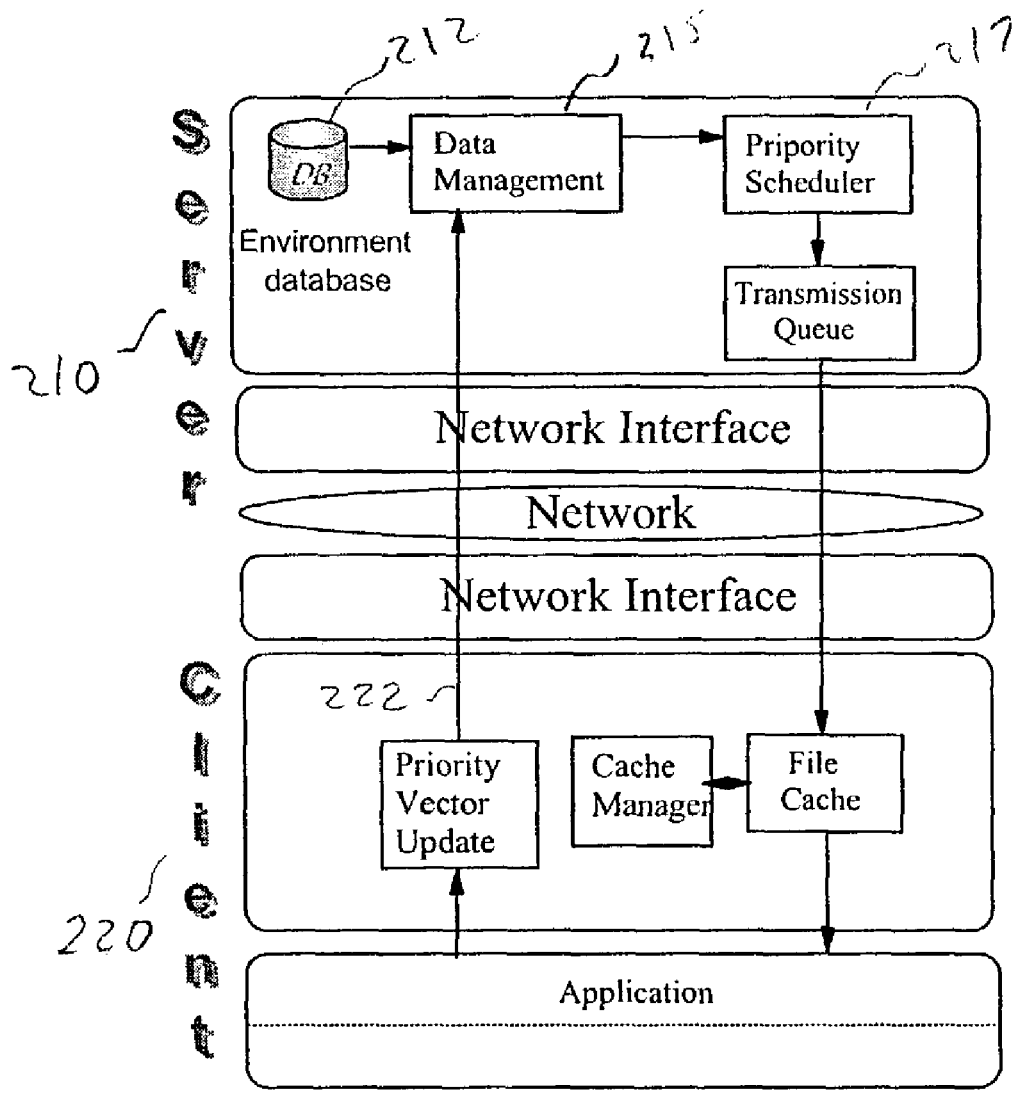
FIG. 2 illustrates the use of a client interest vector for prioritization of data transmission in an interactive networked environment.

According to another exemplary embodiment of the present invention, the transmission priorities are based on a fixed set of priorities transmitted from the client. As depicted in FIG. 2, a client 220 transmits a priority vector 222 to a server 210. The priority vector 222 can include the priority of specific objects in the environment or the priority of types of objects (e.g. objects describing avatars have higher priority than objects describing the background of a scene).

At the server 210, a data management component 215 checks the object name/types stored in an environment database 212 and a priority scheduler 217 assigns priorities to objects/blocks according to the priority specified by the priority vector 222 and block position in the multiresolution object. The server 210 maintains a profile of priorities for each client. The client 220 sends updates of the priority vector 222 which modify the profile on the server. This method can be used to prioritize the transmission of certain types of media objects (e.g. audio objects vs. video objects, or texture/image objects). The prioritization method define per-client policies for prioritization of media objects from the server 210. The process is interactive: the client 220 can update locally the priority vector 222 which triggers the transmission and update of the priority profile at the server 210. Re-prioritization of media object transmission is controlled at the application level and has low frequency (can be done several times per session).

Figure 3:
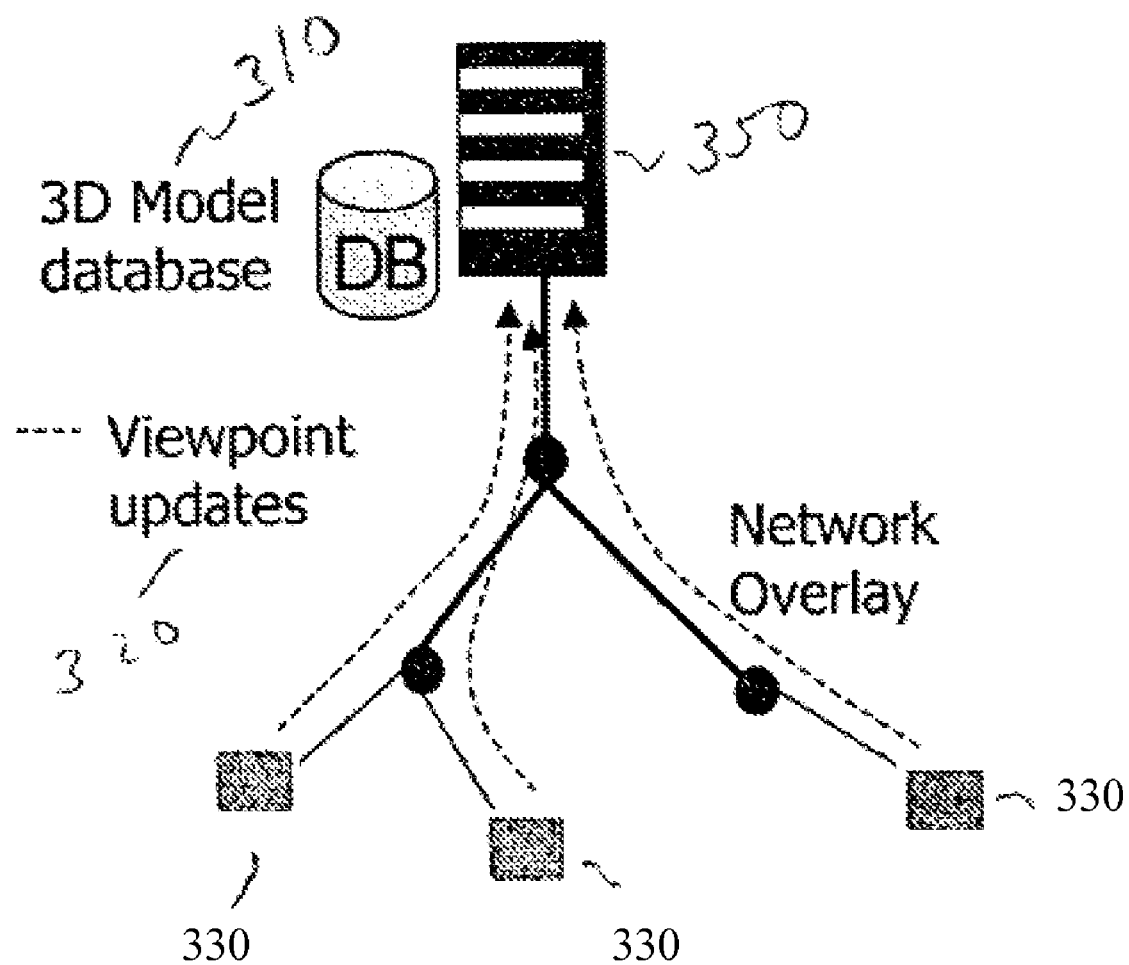
FIG. 3 illustrates a scene graph for data management in an interactive networked environment.

According to another exemplary embodiment of the present invention, the environment is a shared virtual environment which contains graphical objects stored in a database at the server. As illustrated in FIG. 3, the sender maintains a representation of the environment in a 3D model database 310 which can include the position and orientation of the objects. The objects are stored as multiresolution geometries and encoded using a progressive mesh method. The blocks are composed of multiple vertex split transformation. The objects are dynamic and require score recomputation for each transformation applied to the object.

In this case the priority model can be specified analytically and can be computed automatically at the sender based on a set of parameters dependent on user interaction. Viewpoint updates 320 are transmitted from the receivers 330 with a frequency determined by events generated at the receivers 330 or with a fixed sending frequency. The set of objects to be scheduled for transmission is computed using a circular area around the viewpoint of the receiver. The server 350 receives frequent viewpoint updates 320 and changes the coverage of the circular area accordingly, selecting the object whose position intersect the coverage area. Then it places the objects in a transmission queue, performs packetization and schedules according to the method described above.

The server 350 computes the priority set for each receiver 330 individually according to the viewpoint updates 320 received from each receiver 330. A priority queue updates each time a priority vector is received from the corresponding client is maintained for each receiver 330. The transmission queues of each object share the sever bandwidth with equal priority. The data can be scheduled for transmission queues using a round-robin scheduling mechanism.

The priority parameter (viewpoint position) is controlled using input devices or generated automatically by the client application. The frequency of priority parameter updates is controlled by the client based on several factors which include the frequency of the visual display rates and the rate of change of the parameter (e.g. viewpoint speed). The client interest area is defined analytically or using a parametric model (e.g. a section of a circular area).

According to another exemplary embodiment of the present invention, a server uses a predefined model for computing priorities using client transmitted parameters and the priorities of the blocks in each object. The client sends frequent updates of priority parameters. The server update the priority of the blocks in the scheduling queue each time it receive an update from the client. An example of a parameter to be transmitted from the client is its position in a map describing the environment. The client locally controls this position and sends position/orientation updates with some frequency which depend on the frequency of position/orientation changes. The server computes the set of objects from the database required for transmission based on position/orientation parameters. Assume that the selection criteria uses the distance between the object to be transmitted and the client's viewpoint. In this case the server performs distance computation, sorts the objects according to the distance and selects the objects whose distance to the viewpoint is under a specified threshold (model parameter). Sorting, reordering and object database querying is done every time the position of the viewpoint (updated from the client) changes. Client interest is as a multilevel function. For each level the client sends updates with different frequencies and different parametric models. The server queries an environment database and creates multilevel queues which are used to transmit the required objects with different priorities.

This set of objects in the scheduling queue is updated every time the object position/orientation of the viewpoint changes. The server computes block priorities by assigning higher priority to objects closer to client position.

According to another exemplary embodiment of the present invention, prioritizing data transmission between server and client is based on client viewpoint navigation prediction. This method relies on the fact that the priority update vector received from the client can be predicted. For example, navigation in a virtual environment can be predicted based on client viewpoint position. The prediction allows an improvement of the quality of the environment transmitted to the client by: (a) scheduling for transmission additional objects that will be required by the client in the future, and (b) changing the priority of blocks with a quantity that accounts for their future transmission priority. The new priority can be computed as a weighted average of the current priority and future priorities of the block.

For the case of an interactive virtual environment system, the block priorities depend on the position of the objects with respect to viewpoint. The future positions of objects with respect to the viewpoint are associated with probabilities of realizing these positions. The weights of block score are assigned values proportional to the probability of realizing the predicted viewpoint position. The distribution of weights is non-uniform: the position corresponding to smaller changes in direction and speed have higher probability than those corresponding to large variations in the viewpoint speed and direction.

A look-ahead method also applies for the case when future states of the system can be described by a finite set. At each step, an interactive system can branch into a finite number of states, each associated with a probability of transition in that state. The priority of transmitting data associated with a state is then the weighted average of current and predicted states.

According to another exemplary embodiment of the present invention, prioritization of multicast transmission is provided. Prioritization of data transmission to multiple users using only unicast transmissions is an extension of the transmission to a single client presented above. The server maintains priority queues per client and schedules the transmission of object blocks individualy to each client. For prioritization of multicast transmission of content to multiple clients, the server computes overlap in the client interest and multicasts the objects required at multiple clients and unicasts the objects required by single clients. Using multicast transmission to groups of clients increases server throughput when client's interest overlap. The method assumes that the server is hosting a shared environment accessed by users which transmit their interest function. The users are grouped based on interest functions which specify their interest in domains/partitions of the interactive environment. It is assumed that multicast grouping can be performed independently of the scheduling of 3D model transmission. It is to be appreciated that the benefit of multicasting 3D models is only realized when the visual domains of several clients overlap. The data received from multicast channels may fall outside of the visual area of the subscribing client, and therefore result in wasted bandwidth for the greedy scheduler (data is actually stored at the client and may be used at a later time when the object become visible). The amount of overlapping between clients in the same group will vary due to client dynamics. Therefore 3D model multicasting should be limited and combined with unicast transmissions. The optimal scheduling policy involves unicast as well as multicast transmission.

According to another exemplary embodiment of the present invention, multicast transmission is based on client proximity in a virtual space computed at the server. The previous multicast method assumed that the multicast groups are pre-calculated based on client interest and are not computed dynamically by the server based on the overlapping of client's interests. A policy that combines per-client greedy scheduling with per-group greedy scheduling is now described. Under this scheme, the server multicasts geometry blocks of objects found to be overlapping in the interest domains of multiple clients based on their priority. Two scores are maintained per object block: group score $W_G$ and client score $W_c$. The group score of the block is the sum of individual scores over all clients in the multicast group:

$$W_G(obj, i) = \sum_{c=0...N} W_c(obj, i)$$

where N is the number of clients in the multicast group.

A multicast scheduling queue uses the greedy policy described above. The block with the maximum group score over cost is selected for multicast. Only blocks belonging to objects in the overlapping visibility areas are scheduled for multicast, since there is no immediate benefit in multicasting objects that are visible to a single client. At the same time, the client score $W_c$ is diminished so that the potentially multicast blocks with high impact (in the visual area of multiple clients) are de-prioritized in the unicast scheduling queue of each individual client:

$W_c(obj,i)=W(obj,i)/(W_G(obj,i)-W(obj,i)+ct)$ where ct is a constant factor.

Therefore objects in the overlapping zone are less likely to be transmitted on unicast links. As mentioned above, the amount of bandwidth used for multicast is limited to a percentage of the total bandwidth available to the client.

This percentage $P_m$ is proportional to server overload factor $O_v$: the ratio between the "in excess" bandwidth of connected clients and the total server bandwidth: $P_m=\min(O_v/(O_v+1)*N/(N-1)),M_r)$, $M_r$ being the percentage of data in the overlapping zones. The rest of the client bandwidth is used by the geometry scheduled individually per client using the greedy policy. The efficiency of multicast streaming (in terms of increasing the quality of the end-user graphics environments) depends on the degree of overlap between visibility domains.

According to another exemplary embodiment of the present invention, a technique for joint client interest-based clustering and transmission scheduling such that server capacity is used efficiently and each individual client receive most relevant data is provided. A different method for 3D model transmission to multiple users uses a joint multicast grouping and scheduling mechanism. The server keeps track of the receiver's interest and checks all intersections between client interests. Each block is transmitted to a multicast group containing only the receivers interested in this particular object. In case only one object is interested the block is transmitted using unicast. The method is expensive as it require a potentially very large number of multicast groups. Since the dynamics of the multicast groups are very high, this method can only be implemented with multicast solutions that do not require storage of routing information in the network.

For this scheduling policy, the score of each block is calculated as the aggregation of scores from the clients that require the object:

$$W(obj, i) = \sum_{c=0...Ng(i)} W_c(obj, i)$$

where Ng(i) is the number of objects that required object i to be transmitted. This formula establishes that the blocks that are in higher demand on average should be transmitted with higher priority by the greedy scheduler. The scheduler proceeds as in the previous case, transmitting the multicast blocks and then the blocks sent using unicast. The method is generally more efficient than the fixed group multicast described previously due to the high mobility and small overlapping between visual domains of virtual environment clients. The method may lead to transmission of blocks out of sequence. In such case, the receivers are responsible for buffering and reordering the received blocks in addition to reconstruction of the multiresolution object. When a block is transmitted before it's predecessors (out of order), the remaining blocs are assigned higher priorities according to a geometric progression schema.

According to another exemplary embodiment of the present invention, prioritization is based on an aggregate measure of client priorities and service provider policies. A deployment of the data transmission system presented here may involve in addition to the sender and the clients one or more service provider. In this case the networking services for replicating data between server and client are provided by one or multiple service providers on the basis of a service-level agreements. These agreements typically include provisions related to bandwidth availability, end-to-end delay, etc. The prioritization method at the sender can be influenced by the quality of network services specified in the service level agreements. The sender is aware of the service agreements and uses them in the prioritization of data transmission to each individual client. The service agreements are used in two ways: first, the bandwidth and end-to-end delay provisions are used to compute the look-ahead window for data replication; secondly the service-level agreements change the priority of the media types (e.g. when bandwidth is scarce the transmission of text and audio is given higher priority over the video). The server computes a set of weights which multiply the priority of the media objects to be transmitted to each client.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for efficient transmission of digital content to clients via a computer network, the digital content associated with a virtual environment, comprising the steps of:
   determining non-overlapping portions of the digital content to be transmitted to the clients;
   determining overlapping portions of the digital content to be transmitted to the clients;
   scheduling transmission of the non-overlapping and overlapping portions of the digital content so that the non-overlapping and overlapping portions of the digital content are sent in a priority manner, wherein the scheduling includes prioritizing a multicast transmission of high priority portions of the overlapping portions of the digital content according to a per-client score and a per-group score, wherein the per-group score is determined for the overlapping portions of the digital content that overlap in respective visual domains of a multicast group of the clients and is determined from the per-client scores of the multicast group of the clients, and prioritizing a unicast transmission of the non-overlapping portions and low priority portions of the overlapping portions based on the according to a per-client score; and
   transmitting the portions of the digital content to the clients in accordance with the schedule to enable scenes from the virtual environment to be rendered.

2. The method of claim 1, wherein the scheduling step includes prioritizing the transmission of the portions of the digital content based on client-defined interest stored at the sender.

3. The method of claim 1, wherein the scheduling step includes prioritizing the transmission of the portions of the digital content using a parametric model based on client viewpoint position, position of objects in a scene, and visual attributes.

4. The method of claim 1, wherein the scheduling step includes prioritizing the transmission of the portions of the digital content based on predicted client navigation in the virtual environment.

5. The method of claim 1, wherein the scheduling step includes prioritizing the transmission of the portions of the digital content based on a correspondence of client interests.

6. The method of claim 1, wherein the scheduling step includes prioritizing the transmission of the portions of the digital content based on proximity of clients in a virtual space, wherein proximate clients increase the per-group score of portions of the digital content of common interest.

7. The method of claim 1, wherein the scheduling step includes prioritizing the transmission of the portions of the digital content based on aggregation of client interest, the aggregation of client interest increasing the per-group score, and wherein portions of the digital content having higher per-group scores are multicast to predefined interest groups.

8. The method of claim 1, wherein the scheduling step includes prioritizing the transmission of the portions of the digital content based on client-specified priorities determined according to service provider policies.

9. The method of claim 1, wherein an amount of bandwidth of the computer network used for multicast is limited to a percentage of the total bandwidth, wherein the low priority portions of the overlapping portions require bandwidth in excess of the amount of bandwidth of the computer network used for multicast.

10. A system for efficient transmission of digital content to clients via a computer network, the digital content associated with a virtual environment and transmitted to enable the clients to render scenes from the virtual environment, comprising:

a scheduler for determining first and second portions of the digital content to be transmitted to the clients via a unicast transmission and a multicast transmission, respectively, and scheduling transmission of the portions of the digital content so that the first and second portions of the digital content are sent in a priority manner, wherein the scheduler prioritizes transmission of the first and second portions of the digital content, wherein the second portion includes only overlapping portions in respective visual domains of a multicast group of the clients and performs a multicast transmission of the second portion of the digital content to the multicast group of the clients, wherein the first portion includes non-overlapping portions and low priority portions of the second portions; and a queue for holding the first and second portions of the digital content to be transmitted to the clients in accordance with the schedule.

11. The system of claim 10, wherein the scheduler prioritizes transmission of the portions of the digital content based on client-defined interest stored at the sender.

12. The system of claim 10, wherein the scheduler prioritizes transmission of the portions of the digital content using a parametric model based on client viewpoint position, position of objects in a scene, and visual attributes.

13. The system of claim 10, wherein the scheduler prioritizes transmission of the portions of the digital content based on predicted client navigation in the virtual environment.

14. The system of claim 10, wherein the scheduler prioritizes transmission of the portions of the digital content based on a correspondence of client interests.

15. The system of claim 10, wherein the scheduler prioritizes transmission of the portions of the digital content based on proximity of clients in a virtual space.

16. The system of claim 10, wherein the scheduler prioritizes transmission of the portions of the digital content based on client-specified priorities determined according to service provider policies.

17. A program storage device readable by a machine, tangibly embodying a program of instructions executable on the machine to perform method steps for efficient transmission of digital content to clients via a computer network, the digital content associated with a virtual environment, the method steps comprising:

determining non-overlapping portions of the digital content to be transmitted to the clients;

determining overlapping portions of the digital content to be transmitted to the clients;

scheduling transmission of the non-overlapping and overlapping portions of the digital content so that the non-overlapping and overlapping portions of the digital content are sent in a priority manner, wherein the scheduling includes prioritizing a multicast transmission of high priority portions of the overlapping portions of the digital content according to a per-client score and a per-group score, wherein the per-group score is determined for the overlapping portions of the digital content that overlap in respective visual domains of a multicast group of the clients and is determined from the per-client scores of the multicast group of the clients, and prioritizing a unicast transmission of the non-overlapping portions and low priority portions of the overlapping portions based on the according to a per-client score; and transmitting the portions of the digital content to the clients in accordance with the schedule to enable scenes from the virtual environment to be rendered.

18. The program storage device of claim 17, wherein an amount of bandwidth of the computer network used for multicast is limited to a percentage of the total bandwidth, wherein the low priority portions of the overlapping portions require bandwidth in excess of the amount of bandwidth of the computer network used for multicast.

* * * * *